United States Patent
Bartel

[11] Patent Number: 5,808,555
[45] Date of Patent: *Sep. 15, 1998

[54] LOCK SYSTEM FOR A MOTOR VEHICLE WITH ELECTRICAL LOCK ACTIVATORS

[76] Inventor: Peter Bartel, Essener Strasse 168b, D-45529 Hattingen, Germany

[ * ] Notice: The term of this patent shall not extend beyond the expiration date of Pat. No. 5,623,170.

[21] Appl. No.: 506,658

[22] Filed: Jul. 25, 1995

[30] Foreign Application Priority Data

Jul. 30, 1994 [DE] Germany ............................ 44 27 254.5

[51] Int. Cl.⁶ ............................ E05B 65/36; G06F 11/20; G06F 15/20
[52] U.S. Cl. .................................. 340/825.31; 340/525.34; 340/825.06; 70/262; 70/263; 70/264; 70/278; 307/10.2
[58] Field of Search ......................... 340/825.31, 825.34, 340/825.06; 70/262, 263, 264, 277, 278, 279; 370/294; 307/10.2

[56] References Cited

U.S. PATENT DOCUMENTS

| | | | |
|---|---|---|---|
| 4,708,378 | 11/1987 | Ingenhoven | 292/201 |
| 4,744,021 | 5/1988 | Kristy | 364/141 |
| 4,792,950 | 12/1988 | Volk et al. | 371/8 |
| 4,895,009 | 1/1990 | Kleefeldt et al. | 70/264 |
| 5,387,897 | 2/1995 | Bechtle et al. | 340/426 |
| 5,455,571 | 10/1995 | Jansen | 340/825.31 |
| 5,623,170 | 4/1997 | Bartel | 307/10.2 |

*Primary Examiner*—Michael Horabik
*Assistant Examiner*—Yonel Beaulieu
*Attorney, Agent, or Firm*—Herbert Dubno

[57] ABSTRACT

A vehicle lock system has individual door locks each having an actuator provided with a printed circuit board on which a microcontroller, motor driver of the lock actuator, and a multiplexing element are encapsulated, the printed circuit board being mounted in the housing of the respective lock and being connected by the multiplexing element to a single-line data bus for binary communication with the individual lock from the central station.

6 Claims, 3 Drawing Sheets

LOCK SYSTEM FOR A MOTOR VEHICLE WITH ELECTRICAL LOCK ACTIVATORS

FIELD OF THE INVENTION

My present invention relates to a centralized lock system for a motor vehicle and, more particularly, to a lock system in which at least the electrical actuators of the door locks of an automotive vehicle are connected to a data bus utilizing multiplexing.

BACKGROUND OF THE INVENTION

A centralized lock system for an automotive vehicle can have a plurality of vehicle door locks on the respective doors of the vehicle, a central locking unit for controlling the vehicle door locks, a respective electrical actuator or lock positions connected by a mechanical coupling an each individual door lock and usually positioned next to the lock housing and an electrical control and monitoring circuit for actuation and monitoring of the central locking unit. The term "vehicle door" is intended to encompass also the door of the trunk and/or a hood of the vehicle, as well as the filling compartment door or flap which normally conceals the fitting through which fuel is supplied to the vehicle.

The door locks can have, aside from the usual functions, like locking and unlocking, positions providing security against joy riding and vehicle theft. The term "system" is here used in the sense that encompasses a unit whose components are operated in an integrated manner from a central position.

Door locking systems for vehicles are known in a wide variety of constructions as are the door locks which are used therewith. In one locking system over which the invention is deemed to be an improvement, the control and monitoring circuit for the individual control and monitoring functions has separate lines running to the central station from the individual door locks so that a comparatively large number of lines must run to each door lock from the central station and be incorporated into the electrical harness of the vehicle. Mounting of the locks and the wiring of them to the harness can be a time-consuming process.

It should be noted that electrical systems with reduced wiring needs utilizing binary busses, multiplexing and the like are described in German patent DE 34 17 956 C2 and German open application DE 41 41 504 A1. However the principles of these latter systems have not, to my knowledge, been hitherto utilized in the field of vehicle lock systems.

OBJECTS OF THE INVENTION

It is, therefore, the principal object of the present invention to provide a centralized lock system for an automotive vehicle which has a simplified electrical construction or wiring without loss of reliability.

Another subject of this invention is to provide a centralized lock system which is reliable, economical and easy to install, and more readily installable in vehicles having a number of doors to be operated by the lock system.

SUMMARY OF THE INVENTION

These objects and others are attained, in accordance with the invention, in a centralized lock system for an automotive vehicle having a plurality of doors where that lock system comprises:

a respective vehicle door lock at each door of the vehicle, each of the door locks comprising:

a lock housing, a lock mechanism in the housing operatively for locking and unlocking a respective one of the doors, an electric actuator outside said housing and mechanically connected to said mechanism in response to electrical commands fed to the respective electric actuator a printed circuit board in the electric actuator provided with dust-excluding and moisture-excluding encapsulation, a microcontroller encapsulated on the printed circuit board and a driver circuit connected to the microcontroller and encapsulated on the printed circuit board and responsive to the commands for controlling the electric actuator, at least one control sensor in the housing for monitoring lock operation and producing sensor signals indicating the lock operation, and a bidirectional multiplexing element encapsulated on the printed circuit board and connected to the microcontroller for receiving binary signals and producing the commands therefrom and for receiving the sensor signals and generating binary signals therefrom;

a bus system interconnecting all of the multiplexing elements for transmission of binary signals to and receipt of binary signals from the multiplexing elements; and a central control and monitoring circuit connected to the bus system for operating the locks in accordance with information applied to the bus system in the form of binary signals.

More specifically, a vehicle door lock is provided on each of the automotive vehicle doors, a central locking unit is provided for the door locks, the door locks are each mechanically operated by electrical actuators separate from the respective lock housings and a control and relating circuit is provided for actuation and monitoring of the central locking device, operating with control information and monitoring information.

According to the invention:

1.1 the control and resolution circuit includes a bus system for information transfer, 1.2 the bus system operates with multiplex system elements at least one of which is provided in each of the individual electrical actuators, 1.3 for monitoring and control each door lock is associated with a microcontroller, a motor driver and a control sensor which is advantageously provided behind the respective multiplex system element, 1.4 the multiplex system element, the microcontroller and the motor driver of each door lock are provided on a common printed circuit board which is received in the respective electrical actuator, and 1.5 the printed circuit board is encapsulated with the elements described against dust and moisture, i.e. the printed circuit board, the microcontroller, the motor driver and the multiplexing element are enclosed in a dust-free and moisture-tight hermetic manner in the encapsulation.

The bus according to the invention can provide a single-data line for the signals transmitted to and from each door lock for carrying the information for operating that door lock. The bus combines the individual components of the information processing system. One normally can distinguish between a data bus, an address bus and a control bus, in that a data bus serves for the exchange of data, for example, measurement data, the address bus and control bus serve for the transfer of control signals and acknowledgment signals. A bus, therefore, is characterized in that all components connected to the bus, by contrast with classical wiring or cable of electrical and electronic components in a point to point manner, acts generally bidirectionally so that digital signals will be transmitted in each direction.

In the case of a digital bus, the active elements like the locks will have a two-way data traffic on the bus, providing data signals for generating the commands and receiving acknowledgment signals or control signals transmitting to the central location details as to the status of the individual locks.

An advantage of a bus system is that the components connected thereto can themselves be flexible. The effectiveness of a bus system is strongly dependent upon the data transfer speed. When a plurality of active elements are connected to the bus, prioritizing of the effectiveness of such elements may be necessary.

A bus system is a system of bus lines which are defined in accordance with the number and function of the components. A bus system can be a single strand system in which a single wire may run to the microprocessor of each particular station or device which can be connected in a local network. The communication or control information is exchanged in a multiplex operation. In a multiplexing system, the inputs to the multiplexing device are scanned in succession and the information is ordered in a time sequence and applied to the transmission line and/or information from a transmission line, and depending upon its order of receipt is delivered to respective outputs of a multiplexing unit. In the receiver, therefore, simultaneous and synchronous receipt of the signals can allow their distribution to the proper outputs and a bidirectional multiplexing circuit can scan the input channels and bundle the data for synchronous transmission and can receive synchronous data and distribute the data to the various outputs which can be switches or modulators. The inputs can be from various sensors.

The input channels can have respective addresses facilitating bundling of the data and the address-carrying signals, e.g. in binary form, can be bundled for transmission by the multiplexer to a binary data bus for decoding at another location along the bus in an address decoder which separates the address signals, delivering the outputs to respective output channels and separating the address or label from the data.

The invention is based upon the fact that wiring for a motor vehicle lock system can be greatly simplified without loss of reliability if the electrical control and monitoring for each lock, instead of being effected via respective conductors, is accomplished through the use of a multiplexing unit at each lock and with the aid of a binary bus linking all of the locks with the central unit. When a printed circuit board carrying the essential elements is encapsulated and/or provided in each electrical actuator, which itself can be encapsulated as a unit, the electronic components are protected against environmental influences. The system can provide commands for locking, unlocking, additionally securing the individual vehicle locks against joy rides or thefts, releasing the additional locking capacity and providing mechanical or electronic key operation or switching, all with binary signals transmitted along a bus without requiring separate lines for the individual locks.

Most advantageously, the bus system is a digitally operating single-wire bus system with pulse width modulated bits.

In a preferred embodiment of the invention, suitable for use with most locking systems, for motor vehicles, the multiplex system elements utilized at each electric actuator can each have three inputs (bus input, energy input, ground) and, depending upon the internal circuitry of the door lock, a number of outputs (for example, for a central lock switch, an internal lock switch, a key operating switch, control sensors). In general eight outputs, three for the addresses and five for different functions are suitable. The control sensors which are used to signal lock status to the central station can be Hall-effect sensors, i.e. contactless sensors.

The printed circuit board, as noted, is incorporated in the electrical actuator and is additionally provided with a dust-tight and moisture-tight (hermetic) capsule from which any conductors emerge through correspondingly dust-tight and moisture-tight seals. The capsule can be provided for the electrical actuator as a unit although the former construction is preferred.

BRIEF DESCRIPTION OF THE DRAWINGS

The above and other objects, features, and advantages will become more readily apparent from the following description, reference being made to the accompanying drawing in which:

FIG. 2A is a detail of the region IIA of FIG. 2; and

SPECIFIC DESCRIPTION

Figure 1:
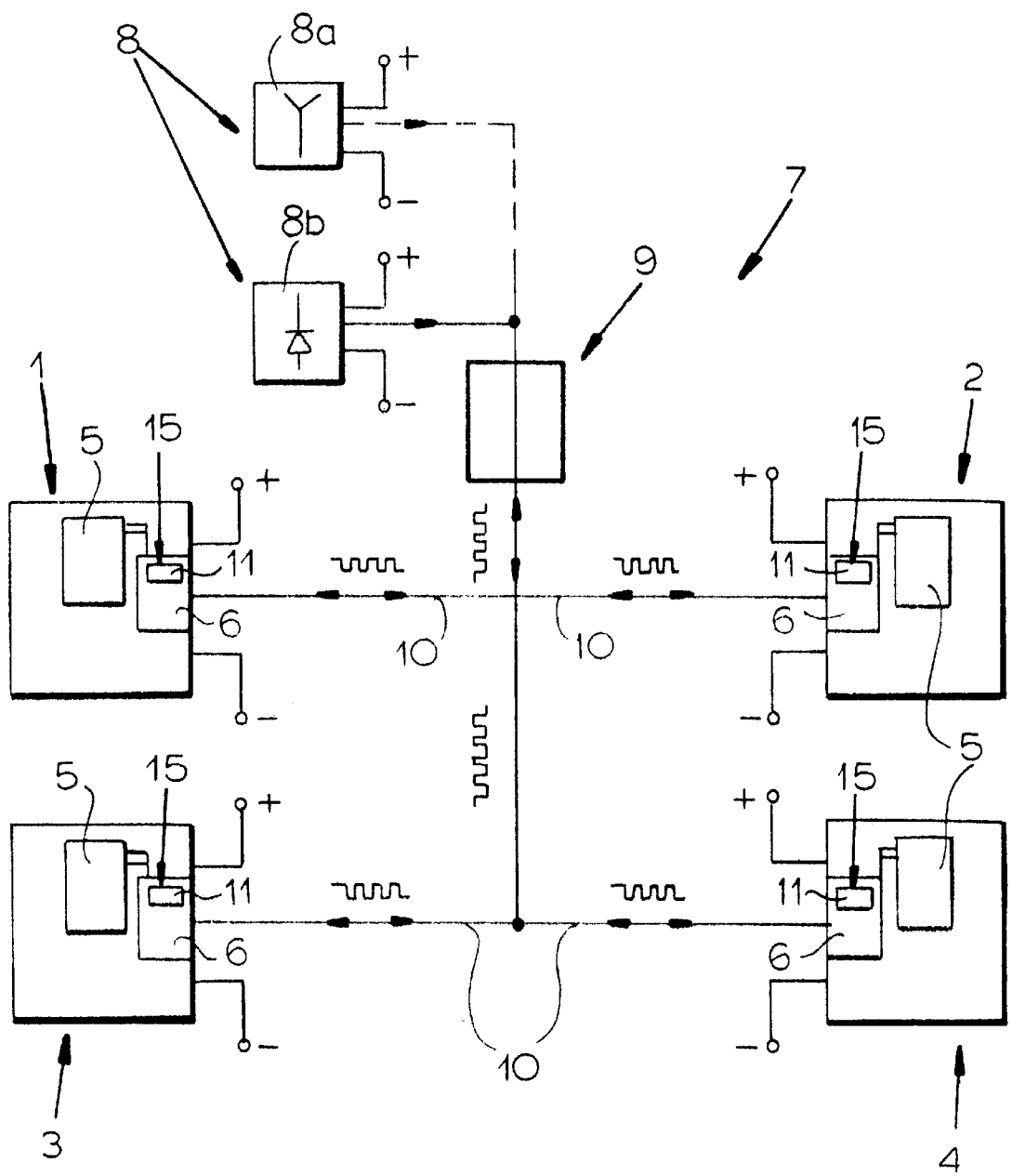
FIG. 1 is a block diagram of a lock system according to the invention.

The door lock system shown in FIG. 1 is provided on an automotive vehicle which can comprise a front driver's door 1, a front passenger door 2 and left and right rear passenger doors 3 and 4, respectively. Each of these doors has a respective lock 5.

The fuel tank fitting can be provided with a flap which can have a similar lock. The locks 5 each include a locking mechanism 5a (FIG. 2) operated by an electrical actuator 6 via a rod 6a pivotally connected to a lever 5b of the respective mechanism. In addition, an electric control and monitoring of the lock is provided from a central location 7 (FIG. 1) which is capable of processing the information for operation of each lock and monitoring information derived from the locks of the doors 1–4.

In the diagram of FIG. 1 it will be clear that operating commands, for example, locking, unlocking, joy ride or theft prevention can be switched on or released by an electronic key represented at 8 and comprising a transmitter 8a and a receiver 8b operating by high frequency or infrared or through some other electronic wireless arrangement.

From FIG. 1 it will be apparent further that the central station 7 includes a central unit 9 which processes the commands and converts them into binary information which is bidirectionally transmitted on a bus system of which the central unit 9 is part.

The bus system is a single-wire bus in the embodiment shown, comprising single wires 10 running to actuators 6 of the locks 5 of the doors 1–4. The central unit 9 and the wires 10 form a bus system 9, 10 which operates with multiplex system elements 11, one of which is provided in each of the locking mechanisms 5. As can be seen from FIG. 2, a multiplexing element 11 is provided on the circuit board built into each electrical actuator 6. The circuit board components are seen as well in FIG. 3 and FIG. 2A shows the multiple inputs and outputs of the multiplex element 11.

Each electrical actuator 6 can include an electric motor 21 and a step-down transmission 21a and can be provided with sensors 21b monitoring the lock position. While elements 21, 21a, 21b have been shown off the printed circuit board 15, it will be understood that they are located in the housing of the actuator 6.

Figure 3:
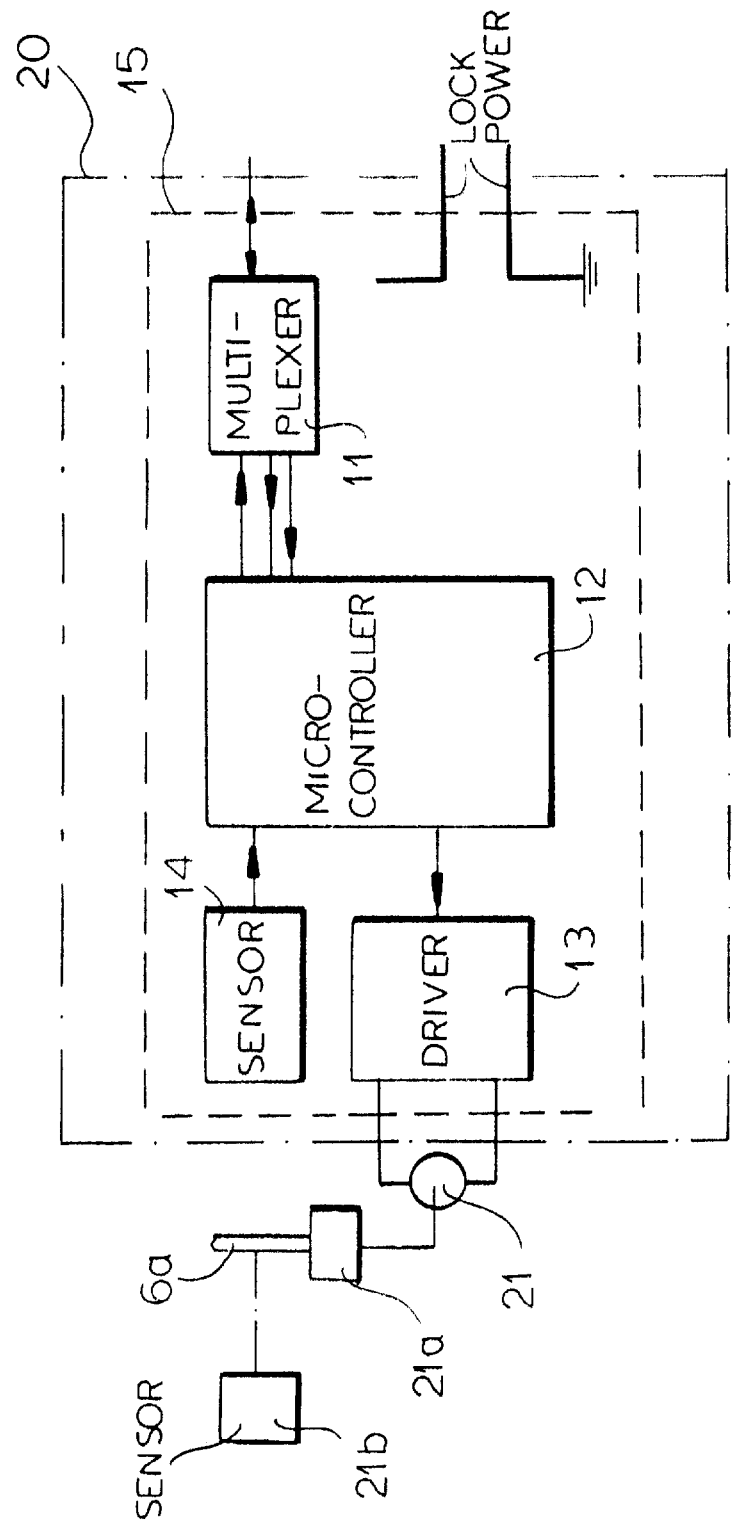
FIG. 3 is a view of a printed circuit board showing its components in block diagram form.

FIG. 3, for example, shows that on the printed circuit board 15 provided with hermetic encapsulation 20, there is a microcontroller 12 and motor driver 13, the latter being connected to the electric motor 21. Control sensors 14 can be provided to monitor operation of the lock and the circuitry 12-14 is provided downstream of the multiplexing system element 11 for the respective door and door lock.

Figure 2:
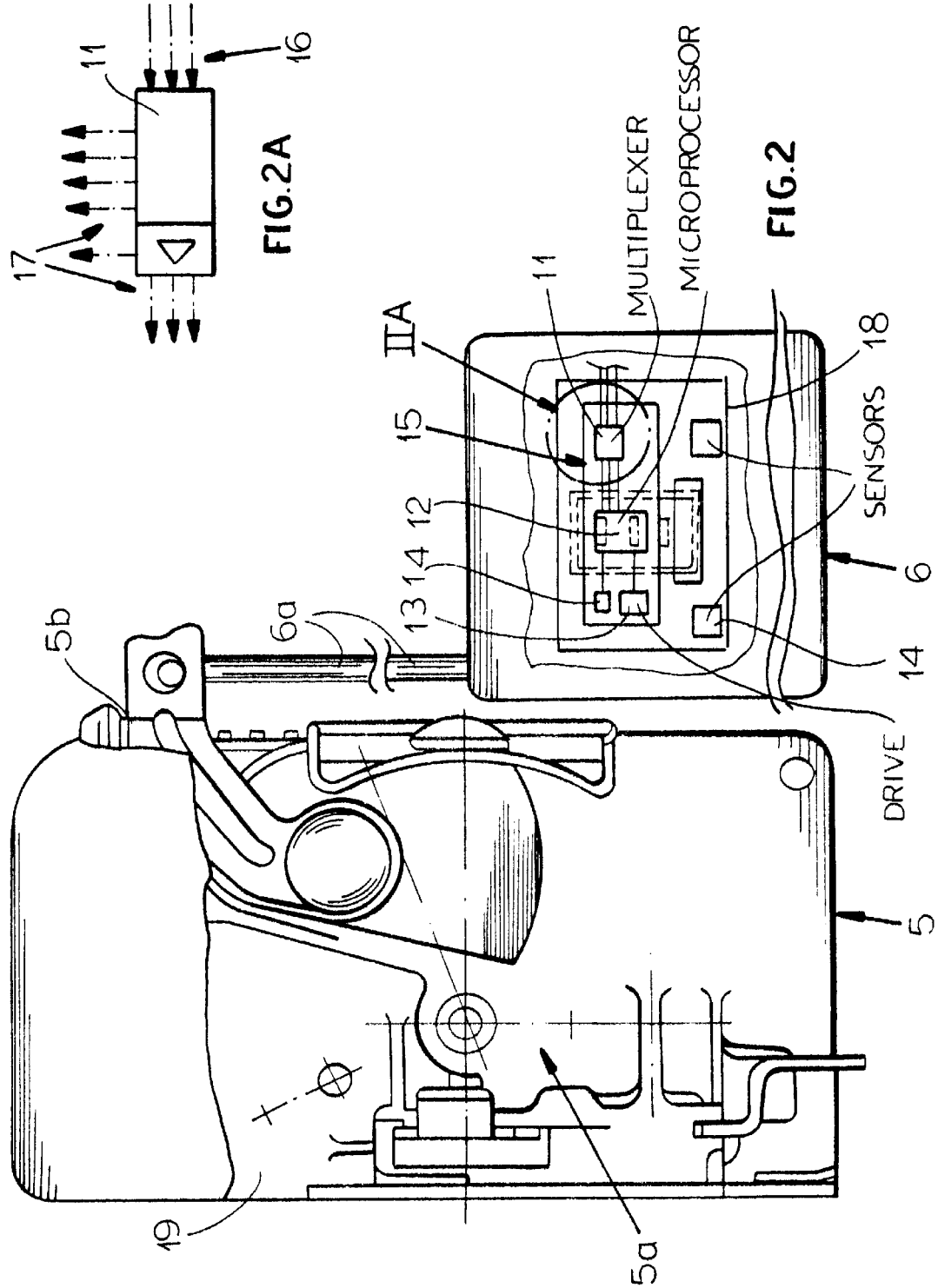
FIG. 2 is a view of one of the door locks of this system with a portion of the housing broken away to show internal parts and the electrical actuator also broken away.

A comparison of FIG. 2 and 3 will show that the multiplexing system element 11, the microcontroller 12 and the motor driver 13 of each door lock 5 are provided on a common printed circuit board 15 which is incorporated in the respective electrical actuator 6. Each circuit board is also fully encapsulated against dust and moisture penetration.

As has been indicated in FIG. 1, the bus system 9, 10 is provided as a digitally-operating single conductor bus system with pulse width modulation of the bits.

The multiplexing system element 11 has three inputs 16, namely, a bus input, an energy input and ground. The multiplex system element 11 can have a number of outputs, depending upon the internal configuration, for the central lock switch, an internal lock switch for key actuation switches and for the control sensors. As shown in FIG. 2A, eight outputs 17 can be provided, three for the addresses and five for the assorted data and operational functions.

The control sensors 14 represented in FIGS. 2 and 3 are contactless electronic switches. The printed circuit board 15 has been represented in FIG. 2 as having a moisture and humidity blocking enclosure or capsule as represented at 18.

While the electrical actuator 6 has a housing separate from the lock housing, even through it is a separate unit with the printed circuit board incorporated therein, it can be built into the lock housing if desired.

I claim:

1. A centralized lock system for an automotive vehicle having a plurality of doors, said lock system comprising:
    a respective vehicle door lock at each door of the vehicle, each of said door locks comprising:
        a lock housing,
        an electric actuator,
        a lock mechanism in said housing operatively connected to said electric actuator for locking and unlocking a respective one of said doors in response to electrical commands fed to the respective actuator,
        a printed circuit board in said actuator provided with dust and moisture excluding encapsulation,
        a microcontroller encapsulated on said printed circuit board and a driver circuit connected to said microcontroller and encapsulated on said printed circuit board and responsive to said commands for controlling said actuator,
        at least one contactless control sensor integrated in a circuit on said printed circuit board for monitoring lock operation and producing sensor signals indicating said lock operation, and
        a bidirectional multiplexing element encapsulated on said printed circuit board and connected to said microcontroller for receiving binary signals and producing said commands therefrom and for receiving said sensor signals and generating binary signals therefrom;
    a bus system interconnecting all of said multiplexing elements for transmission of binary signals to and receipt of binary signals from said multiplexing elements; and
    a central control and monitoring circuit connected to said bus system for operating said locks in accordance with information applied to said bus system in the form of binary signals.

2. The centralized lock system defined in claim 1 wherein each actuator is disposed outside the respective lock housing and is mechanically connected to the respective mechanism.

3. The centralized lock system defined in claim 2 wherein said bus system is a single-wire bus operating with pulse-width-modulated bits.

4. The centralized lock system defined in claim 2 wherein said multiplexing element has three inputs including a bus input, a power input and a ground, and a plurality of outputs.

5. The centralized lock system defined in claim 1 wherein said contactless sensor is a Hall-effect sensor.

6. The centralized lock system defined in claim 2 wherein the encapsulation is a dust-tight and moisture-tight capsule surrounding said printed circuit board.

* * * * *